Oct. 29, 1935.  E. SCHWEIZER  2,019,364
DRIVING DEVICE FOR TWISTING MACHINES
Filed Sept. 9, 1933
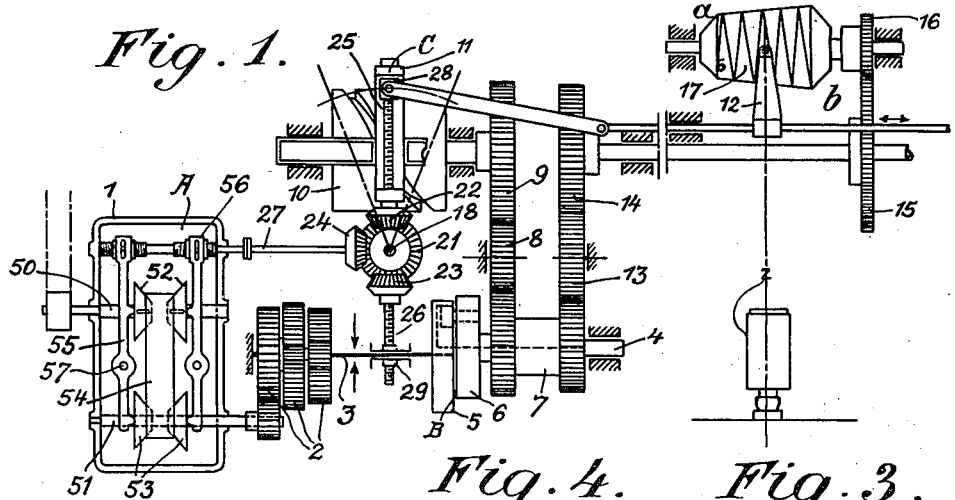
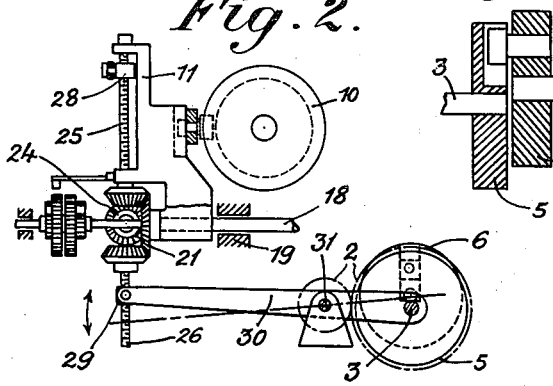
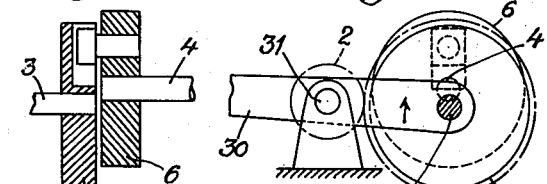
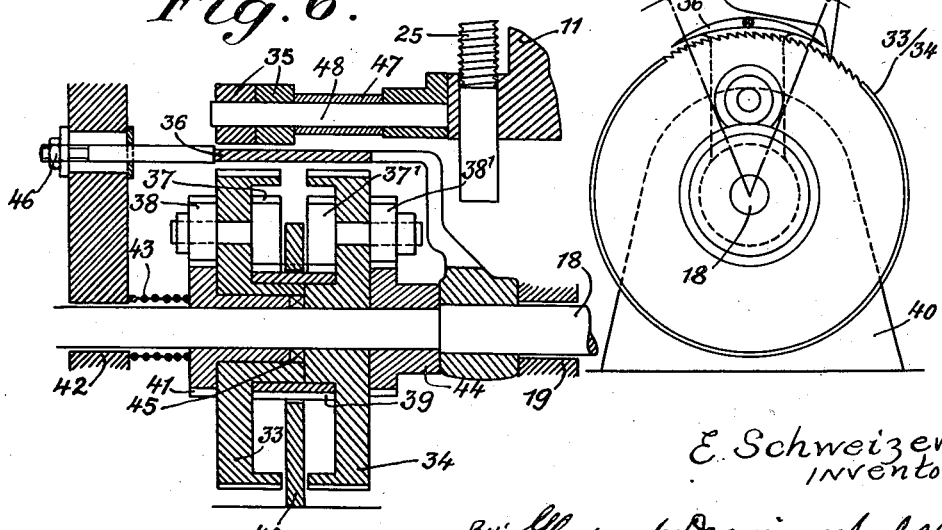

Patented Oct. 29, 1935

2,019,364

UNITED STATES PATENT OFFICE 2,019,364

DRIVING DEVICE FOR TWISTING MACHINES

Ernst Schweizer, Zurich, Switzerland

Application September 9, 1933, Serial No. 688,841
In France September 9, 1932

1 Claim. (Cl. 117—26)

This invention relates to driving devices for the winding bobbins of machines twisting at delivery.

The invention is illustrated by way of example in the accompanying drawing in which:

Fig. 1 is an elevation of the driving device and a twisting station.

Fig. 2 is a side elevation of a control device.

Fig. 3 is an elevation of a non-uniform drive gear.

Fig. 4 is a section of the non-uniform drive gear.

Figs. 5 and 6 are an elevation and a section, respectively, of ratchet mechanism for controlling the compensating devices.

The machine is driven by belt or motor by way of a variable speed gear A shown in Fig. 1. On the driving shaft 50 as well as on the driven shaft 51 there is mounted a pair of bevel wheels 52 or 53, respectively, the wheels of the same pair being directed one towards the other and adapted to be simultaneously displaced on their shaft towards and away from one another. These pairs of wheels are connected one with another by means of a belt 54 or the like of suitable cross section. The wheels 52 and 53 are located on the same side of the belt 54 and connected one with another by means of a lever 55 or 56, respectively, the pivot 57 of which is located between said wheels, the free end of each of said levers 55, 56 being mounted on a threaded part of the shaft 27. The threads on these threaded parts are reversely directed upwardly when the shaft 27 rotates, the ends of the levers 55, 56 mounted thereon move one towards the other or away from the other according to the direction or rotation of the shaft 27, whereby the speed of the shaft 51 is varied in one sense or the other. It is to be noted that such a variable speed device is old in the art and specifically not a part of the invention. The variable speed gear is operatively connected to a shaft 3 by gears 2. The shaft 3 is coupled to a shaft 4 out of axial alignment with the shaft 3 by means of a slotted-disc and crank-pin coupling 5, 6 (Figs. 1-4) so that the shaft 4 is non-uniformly rotated. 12 denotes the thread guide which is reciprocated by a cam 10 driven from the shaft 4 by way of gears 7, 8 and 9. The cam 10 imparts rocking movement to a lever 11 pivoted on the shaft 18 journalled at 19 and serving to impart reciprocatory movement to the thread guide 12 through the medium of a connecting rod and slide bar. The shaft 4 drives the winding bobbin 17 by way of the gears 7 consisting of two connected cog-wheels and the gears consisting of the wheels, 13, 14, 15 and 16.

The shaft 18 is driven by ratchet gearing (Figs. 5 and 6) actuated by pawl and ratchet mechanism operated by the lever 11. A bevel pinion 21 fixed on the shaft 18 meshes with bevel pinions 22, 23 and 24, of which the pinion 24 is fixed on a shaft 27, whereby the intermittent motion of the shaft 18 is transmitted to screw-threaded spindles 25, 26 and to the shaft 27. Rotation of the spindles 25, 26 effects displacement of nuts 28 and 29 thereon. Rotation of the shaft 27 effects variation of the transmission through the variable speed gear 1. The spindle 25 and nut 28 are carried by the lever 11, the nut 28 being operatively connected to the connecting rod for actuating the thread guide 12, so that displacement of the nut 28 controls the length of stroke of the thread guide 12. The nut 29 is carried by the long arm of a lever 30 pivoted at 31 on the framework of the machine. When the nut 29 is displaced, the lever 30 is rocked about its pivot 31. The short arm of the lever 30 forms the sole bearing of the shaft 3, so that rocking movement of the lever 30 moves the shaft 3 towards or further from alignment with the shaft 4.

The mechanism shown in Figs. 5 and 6 incorporates a sun-and-planet reduction gearing having a large reduction ratio. 33 and 34 are ratchet wheels alternately engageable by pawls 35 carried by the lever 11 by means of a bolt 48. 36 is an adjustable masking segment loosely mounted on the shaft 18 and extending through a slot of a bearing 42 where it can be fixed in any desired position by means of a screw nut 46. Each of the ratchet wheels 33, 34 carries planetary pinions 37 and 38 or 37' and 38', respectively having equal numbers of teeth and forming a planetary unit. The inner pinions 37 37' mesh with a sun wheel 39 mounted upon the hubs of the ratchet wheels 33 and 34 and adapted to be held against rotation by a member 40. The pinion 38 meshes with a spur wheel 41 loose on the shaft 18, on the hub of which spur wheel 41 the ratchet wheel 33 is journalled. The spur wheel 41 is urged into clutching engagement with the ratchet wheel 34 by a spring 43 interposed between the spur wheel 41 and the bearing 42. The pinion 38' meshes with a spur wheel 44 secured to the shaft 18. The spur wheels 41 and 44 have the same number of teeth, namely one less or one more than the number of teeth of the sun wheel 39. The function of the gearing above described is as follows: If the pawls 35 act upon the ratchet wheel 33, this latter is slowly rotated on the wheel 41 whereby the planetary pinions 37 and 38 roll off on the wheels 39 and 41. As the wheel 39 is retained by the member 40 and has less teeth than the wheel 41 this latter turns the slower the smaller will be the difference in the numbers of teeth of the wheels 41 and 39. The wheel 41 which is exposed to the pressure of the spring 43 and rotates loosely on the shaft 18, engages with the second ratchet wheel 34 by means of clutch-teeth 45 so that this wheel 34 rotates with the same speed as the wheel 41. Therefore the planetary wheels 37' and 38' which are rigidly connected one with another and mounted on the ratchet-wheel 34, roll off very slowly on the wheels 39 and 44. The wheel 39 being retained, wheel 44 in view of its less number of teeth, rotates still more retarded and just so the shaft 18 rigidly connected with it.

As the number of revolutions of the shaft 18 must be variable in accordance with the strength of the thread which shall be worked up on the machine, the arrangement is made so as to allow the number of teeth engaged by the pawls 35 to be altered. The pawls 35 move to and fro always the same amount but according to the position of the masking segment 36 they slide on a greater or smaller part of their way on said segment without engaging the pawl wheel 33 so that by this means there is given the possibility to vary the number of teeth for which the pawl-wheel is moved forward. In the case where for very coarse threads the speed of the forward motion is to be very much increased, the pawls 35 may be displaced by removing the box 47 on the shaft 48 so that the pawls can act upon the ratchet-wheel 34. In this case the pawl wheel 33 rests in position as it is pressed backward by the teeth 45 to enable the rotation of the wheel 34.

If a conical bobbin 17 having convergent ends (see Fig. 1) is to be produced, and the drive of the bobbin is to be effected not by contact with a friction roller, as hitherto, but by toothed wheels or friction wheels, provision must be made for compensation in the drive to obtain a constant rate of spooling, it being understood that the driving members control the speed in correspondence with the conicity and with the decreasing stroke of the thread guide.

Power being derived from the constant speed motor, the machine is driven by way of the variable speed gear 1, gearing 2 and shafts 3 and 4.

The relative eccentricity of the wheels 5 and 6 is varied with increase of the diameter of the winding. This is effected by a slow rocking movement of the lever 30 and therewith of the shaft 3 and wheel 5 mounted thereon. The last stage of the gearing 2 being mounted on the pivot 31, and the shaft 3 and the lever 30 being also mounted on the same pivot 31, the rocking movement of the lever 30 does not interfere with the driving of the shaft 3 by way of the reduction gearing 2.

The nut 29 is so displaced that, when the thread guide 12 arrives at the small diameter end of the bobbin, the shaft 4 is rotating at its maximum speed, and, when the thread guide 12 arrives at the large diameter end of the bobbin, the shaft 4 is rotating at its minimum speed. The cam 10 being driven from the shaft 4, non-uniform motion is transmitted to the thread guide 12, so that the motions of the bobbin and thread guide are synchronized.

Simultaneously with the building up of the bobbin, shift of the compensating devices A, B, C takes place under the action of the ratchet gearing on the shaft 18 which acts through the bevel pinions 21, 22, 23 and 24 on the spindles 25, 26 and on the shaft 27. With increase of the rate of spooling the ratio of the diameters $a$ and $b$ of the bobbin 17 changes. In the same proportion the departure from uniformity of rotation of the shaft 4 is decreased by displacement of the nut 29 to decrease the distance between the axes of the shafts 3 and 4. At the same time the nut 28 is displaced so that the stroke of the thread guide 12 is progressively reduced, whereby the thread guide is caused to form the convergent bobbin ends. In order to maintain the rate of spooling constant with increasing diameter of the bobbin, the shaft 27 is so rotated by the ratchet gearing that the transmission by way of variable speed gear 1 is varied whereby to decelerate the shaft 3 in accordance with the increasing diameter of the bobbin 17.

In order to produce tapered bobbins, the driving of the spindle 25 is interrupted, the stroke of the thread guide 12 remaining constant, while for obtaining bobbins with convergent ends the shaft coupling B (5, 6) must be so adjusted that the shafts 3 and 4 are aligned. If the means for varying the traverse of the thread guide is rendered inoperative and the shafts 3 and 4 are aligned, cylindrical cross-wound bobbins or flanged bobbins may be produced.

What I claim is:

A driving device for the winding bobbins of machines twisting at delivery, comprising a thread guide adapted to perform a reciprocating movement, two gears adapted to diminish automatically and at the same time the number of revolutions of the bobbins and the stroke of said thread guide with increasing diameter of the bobbin, a non-uniform transmission train in connection with said gears and comprising two wheels eccentric to one another, a crank-pin and slot coupling interconnecting said wheels, a rocking lever carrying one of these wheels, this rocking lever being connected with one of said gears in such a manner that the relative eccentricity of said wheels is adjustable during the winding period by rocking said lever.

ERNST SCHWEIZER.